United States Patent [19]

Furlong

[11] Patent Number: 4,663,136

[45] Date of Patent: May 5, 1987

[54] EMISSION CONTROL PROCESS FOR COMBUSTION FLUE GASES

[75] Inventor: Dale A. Furlong, Vinton, Va.

[73] Assignee: Ets, Inc., Roanoke, Va.

[21] Appl. No.: 614,542

[22] Filed: May 29, 1984

[51] Int. Cl.[4] .......................... B01J 8/00; C01B 21/00; C01B 17/00; C01B 7/00

[52] U.S. Cl. .................................... 423/239; 423/240; 423/244

[58] Field of Search .......... 423/242 A, 244 A, 242 R, 423/244, 239, 239 A, 240 R, 240 S

[56] References Cited

U.S. PATENT DOCUMENTS

| | | | |
|---|---|---|---|
| 3,976,747 | 8/1976 | Shale et al. | 423/244 |
| 4,103,902 | 8/1978 | Steiner et al. | 277/12 |
| 4,105,744 | 8/1978 | Erdoess et al. | 423/239 |
| 4,115,518 | 9/1978 | Delmon et al. | 423/244 |
| 4,178,349 | 12/1979 | Wienert | 423/244 |
| 4,197,278 | 4/1980 | Gehri et al. | 423/242 |
| 4,324,770 | 4/1982 | Bakke | 423/242 |
| 4,344,920 | 8/1982 | Isserlis | 422/169 |
| 4,372,926 | 2/1983 | Gude et al. | 423/244 |
| 4,442,080 | 4/1984 | Donnelly et al. | 423/244 |

OTHER PUBLICATIONS

Shale, C. C., and Stewart, G. W., "A New Technique for Dry Removal of $SO_2$," U.S. Dept. of Energy, Morgantown, W.V.

*Primary Examiner*—Gregory A. Heller
*Attorney, Agent, or Firm*—Bacon & Thomas

[57] ABSTRACT

A process and apparatus is described for removing acid gas and fly ash directly from hot flue gas without the necessity of pretreating the gas. In addition, valuable heat energy is conserved in this process. The process involves three stages of operation which, when operated in sequence, allows condensation to form on the scrubbing medium without any preconditioning step. The process is particularly useful for removing $SO_2$ or $SO_3$ from flue gas.

11 Claims, 9 Drawing Figures

9
8
4
1
2
3
5
7
6
A
10
11
A
10
A-A

20

A-A
A
20
45

12
13
14
15
16
17
18
19
23
A
21
22
21a

EMISSION CONTROL PROCESS FOR COMBUSTION FLUE GASES

BACKGROUND OF THE INVENTION

1. Field of the Invention

The present invention relates to the art of controlling the emissions of both particulate material and acid gases from flue gases. The term "flue gas" as used herein refers to the hot waste gas mixture which results from various acid gas producing processes such as the gas from coal-fired electric power plants and the like wherein the acid gases are sulfur oxides. The flue gas may also include an amount of small particulates commonly referred to as "fly ash".

Because of various economical and environmental factors, it has become increasingly more important for the effective and economical removal of fly ash particulates and acid gas, especially $SO_2$ and $SO_3$, from the flue gas. A primary benefit of such an effective and economical method of removing the constituents from flue gas is that it allows operators of coal fired plants to burn cheaper high sulfur coal while minimizing the environmental hazards of using such a fuel. This invention not only minimizes these hazards by removing the undesirable constituents from the gas, but does so with a minimum expenditure of energy which results in appreciable cost savings not achievable by other methods.

2. Description of Prior Art

Prior art methods have traditionally involved either wet scrubbing processes or dry scrubbing processes. Both of these processes are used to remove sulfur oxides from flue gas.

In the wet process, $SO_2$ dissolves in scrubber water droplets where it reacts with a limestone slurry resulting primarily in calcium sulfite. A sulfite sludge is continuously removed from the scrubber liquid for disposal. Normally, fly ash is first removed from the flue gases by an electrostatic precipitator (ESP) prior to the scrubber to minimize the build-up of fly ash in the scrubber liquid. This process uses conventional chemical processing equipment and a low cost reagent, such as limestone; but the overall system is complex and its operation and maintenance is often difficult for electric utility operating personnel who are not experienced in chemical processes. Difficult scaling problems have been encountered and it has been difficult and expensive to dispose of the generated sludge material. These disadvantages have led to the current interest in and acceptance of the alternative dry scrubbing process which utilizes lime in a spray dryer.

In the dry scrubbing process, lime (calcium oxide) is slaked (mixed with water) to form a slurry of calcium hydroxide. The slaked lime slurry is introduced into a spray dryer through an atomizer where it contacts the hot gas. In the spray dryer, the $SO_2$ is reacted to form calcium sulfate or sulfite while simultaneously the slurry droplets are dried. The dried particles and fly ash are next removed from the flue gas stream normally by a fabric baghouse filter. The dry scrubber method has been found to be somewhat simpler than the wet process, although the capital cost advantage generally is not too great. It does,of course, eliminate the wet sludge disposal costs and problems. However, it incurs a significant cost disadvantage by using lime instead of limestone. Lime typically costs anywhere from $50.00 to $100.00 per ton, whereas limestone only costs $5.00 to $10.00 per ton.

Both of these processes, the wet scrubber and the dry scrubber, are generally considered too expensive and too complex to operate to be suitable for use in many industrial coal-fired boiler installations.

A more recent advance in this technology is the modified dry limestone process for control of sulfur dioxide emissions illustrated in U.S. Pat. No. 3,976,747. In this process, large size particles of limestone are contacted with preconditioned flue gas in which the fly ash has been previously removed. The preconditioning of the flue gas involves both cooling and increasing the moisture content, preferably to the saturation point. This preconditioning assures that at least some condensation occurs on the limestone particles which is said to enhance the limestone reactivity with the sulfur oxides. When both the temperature and saturation temperature are preconditioned in the manner described by this patent, the scrubbing effect of the limestone remains quite high over an extended period of time and it is only necessary to periodically remove the solid product from the surface of the limestone particles. However, the preconditioning requires that the flue gas be substantially cooled by spraying water or low pressure steam into it before it passes through the limestone and, as a result, the temperature of the flue gas is reduced and this energy cannot be easily recovered.

Accordingly, there remains a need in the art for a process for treating flue gas to remove acid gas (especially sulfur oxides) and fly ash without the preconditioning steps of cooling and moisturizing so that heat energy can be conserved.

SUMMARY OF THE INVENTION

It is an object of the present invention to provide a highly efficient flue gas fly ash removal and acid gas removal technique which utilizes unconditioned hot flue gas and particulate scrubbing material in a simple and economical manner.

It is a further object to provide such a process wherein the heat of the conditioned flue gas is recovered and used to preheat combustion air.

It is a further object to provide a simple and reliable apparatus for carrying out the method of the present invention.

These, and other objectives, are accomplished by first passing unconditioned hot flue gas through a bed of cold granular scrubbing material. During this step, water from the flue gas condenses on the surface of the scrubbing material and the acid gas in the flue gas reacts with the scrubbing material to produce a crust of solid reaction product on the scrubbing particles. In addition, fly ash is also entrapped in the wet scrubbing material particles. As the flue gas is cooled, the scrubbing particles are heated. Eventually, as the limestone approaches the flue gas inlet temperature, the condensation stops and the previously deposited water is evaporated.

Next, the flue gas flow is stopped and the bed of scrubbing material is regenerated. Regeneration is accomplished by agitating the scrubbing particles, possibly by fluidizing or by mechanical vibration. The agitation separates the crust from the particles and the crust is removed from the bed by entraining the crust particles in a stream of hot acid gas, free gas or air, which is blown through the bed. The fly ash is likewise removed from the bed. The entrained fly ash and crust particles are subsequently removed from this gas stream in a separate filtering device such as a bag filter.

Lastly, the hot, clean scrubbing material is cooled to prepare it for further contact with unconditioned hot flue gas. Preferably, cooling is accomplished by circulating an effective amount of precombustion air through the hot bed of scrubbing material. This step produces a cold bed of partriculate scrubbing material having the capability of causing condensation when the next stream of unconditioned hot flue gas is passed through it. The scrubbing material has this capability when it is cooled to below the dew point of the flue gas.

The process is carried out in a granular bed of scrubbing material, or module, having means for introducing the gases and for agitating or separating the crust from the particles. A plurality of these modules may be arranged in the form of a stack and each system may have more than one stack. If more than one stack is used, all modules in a stack may be operated simultaneously thus reducing the number of operating valves required.

The invention also provides for a system having a plurality of beds or modules wherein some of the modules are scrubbing the flue gas while other modules are in the regeneration process of removing the collected crust or cooling the scrubbing particles.

For the sake of convenience, the drawings and detailed description of the invention describe a preferred embodiment of the invention wherein the acid gas to be removed from the flue gas is a sulfur oxide and the particulate scrubbing material is limestone or calcium carbonate, it being understood, however, that the invention is also applicable to the removal of other acid gases such as nitrogen oxides and hydrogen halides and can use other scrubbing materials such as magnesium carbonate, sodium carbonate, dolomite, nahcolite, trona and mixtures thereof.

DESCRIPTION OF THE DRAWINGS

FIG. 2B is a cross sectional view of 2A taken at line A—A.

FIG. 3A is a top view of FIG. 3B. FIG. 3C is a cross sectional view of FIG. 3B taken at line A—A.

DETAILED DESCRIPTION OF THE INVENTION

The present invention uses a new process for eliminating sulfur oxides and/or other acid gases from the flue gas without the necessity of preconditioning the flue gas as in the prior art methods. In addition, in a preferred embodiment of this process, heat is recovered from the flue gas and utilized to preheat combustion air before it enters the furnace, thus resulting in greater efficiency and cost savings not possible in the prior art methods. The process utilizes a modular unit of the type illustrated in FIG. 1.

Figures 1, 2A, 2B, 3A, 3B, 3C:
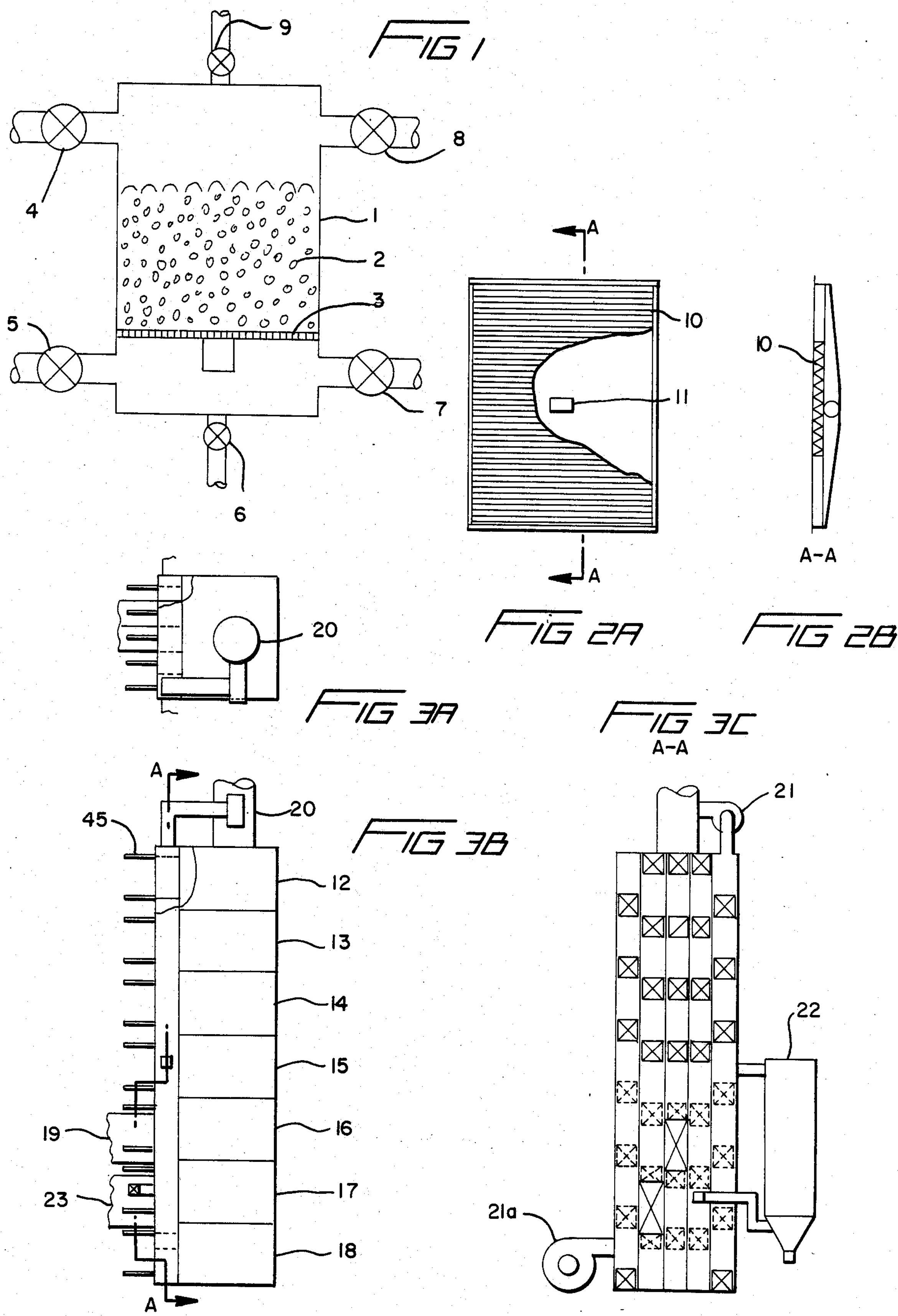
FIG. 1 is a schematic diagram of the basic granular limestone bed module used in the limestone emission control apparatus of the invention.
FIGS. 2A and 2B illustrate an embodiment of the distributor plate within a module.
FIGS. 3A, 3B and 3C illustrate one embodiment of the limestone emission control device having a stack of modules or beds.

The process involves three stages of operation which can be understood by reference to FIG. 1. FIG. 1 shows the basic unit of a limestone emission control (LEC) system which comprises a housing 1, a bed of particulate scrubbing material 2 which is held on a distributor plate 3. Valves 4–9 control the flow of the various gases which pass through the system.

In operation, the first stage, a filtering and scrubbing stage, commences when valves 4 and 5 are opened to allow a flow of flue gas which enters the housing through valve 4, passes through the cold particulate scrubbing material 2 and distributor plate 3 and exits through valve 5. The scrubbing material may be any of the known materials capable of reacting with the acid gas to produce a solid reaction product on the scrubbing particles. Useful materials include calcium carbonate (limestone), magnesium carbonate, sodium carbonate, dolomite, nahcolite, trona as well as a mixture of two or more of these materials. Calcium carbonate or limestone is the preferred scrubbing material for removing sulfur oxides from the flue gas. Sodium compounds such as sodium carbonate, nahcolite and trona are particularly useful for removing nitrogen oxides. For the sake of convenience, the remaining description will be made in reference to sulfur oxide acid and a limestone particulate scrubbing material, it being understood the above-mentioned substitutions are within the scope of the invention.

As the hot flue gas contacts the cold limestone, condensation of water occurs on the limestone. Sulfur oxides, such as $SO_2$, are absorbed into the film of water condensation and subsequently react with the limestone to form a crust of reaction product on the limestone particles. In addition, the fly ash present in the unconditioned flue gas is trapped in the bed of wet particles. Eventually, hot flue gas heats the limestone particles to a point where condensation is no longer possible and the previously formed condensate of water evaporates, leaving a dry reaction product crust on the particles. At this point, sulfur oxides are no longer efficiently removed from the system and this marks the end of the first stage of operation.

In the second stage, the cleaning or regeneration stage, the reaction product crust is separated from the limestone and the separated crust and accumulated fly ash are removed from the bed. The crust is separated by any suitable means including agitation by fluidizing or by mechanical fluidization. The separated crust and fly ash are then removed from the system by any suitable means. Preferably, the separted crust and fly ash are removed from the bed by entraining them in a stream of hot gas free of sulfur oxides. This second stage is carried out in the apparatus of FIG. 1 by closing valves 4 and 5 and opening valves 6 and 9. This stops the flow of flue gas and replaces it with a counterflow of hot gas free of sulfur oxides which enters through valve 6 and exits through valve 9. The previously captured fly ash together with the crust of reaction product is abraided and entrained in the countercurrent hot air stream passing from valve 6 to valve 9. This air stream may then be passed to a conventional filtering device such as a bag filter for removing the entrained material.

When the means of separating the crust from the limestone involves agitation, it is preferred to use a distributor plate design shown in FIGS. 2A and 2B.

This plate comprises a perforated area indicated by numeral 10. Associated with this perforated area is an agitating means such as a pneumatic vibrator 11.

The final stage involves preheating the combustion air for the furnace with the consequential cooling of the limestone particles. It is necessary for the limestone to be cooled so that when the first stage is initiated again, the limestone will be cool enough to cause condensation without the necessity of preconditioning the flue gas. This stage is accomplished in the apparatus of FIG. 1 by closing valves 6 and 9 and opening valves 7 and 8. Cool air enters through valve 7, passes through the distributor plate and heated limestone and exits as hot combustion air through valve 8. Use of this hot pre-combustion air in the furnace results in a significant cost saving which is not readily achievable when the flue gas is preconditioned.

Periodically, fresh limestone particles are added to the bed to compensate for the portion which is depleted as it reacts with the sulfur oxides. In such a case, suitable means may be attached to the apparatus of FIG. 1 to add limestone to the system.

The LEC system includes an embodiment wherein there is a plurality of beds in which the activity of all three stages is coordinated so that scrubbing, filtering, cleaning and preheating all occur simultaneously. Such a system is shown in FIGS. 3A, 3B and 3C, which show seven beds, 12–18, or modules in a stacked relationship. Flue gas enters through pipe 19 and is directed to one or more beds in the filtering and scrubbing stage. Cleansed flue gas exits the system through pipe 20 with the assistance of induced draft fan 21. Meanwhile, one or more of the beds are in the cleaning stage and the remaining beds are in the precombustion air heating stage. Air which is to be preheated for combustion enters as cold ambient air through the forced draft fan **21*b*. The beds in the cleaning stage send the entrained crust and fly ash to baghouse 22. The beds in the preheating stage send the heated precombustion air out of the system through pipe 23. Each bed is cycled through the sequential three stages of operation by means of poppet valves, one of which is illustrated by numeral 45**.

Figure 4:
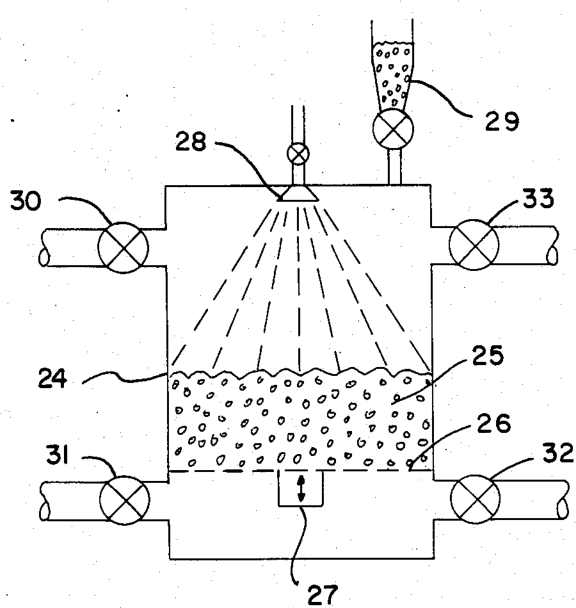
FIG. 4 is a schematic diagram of the granular limestone bed module of the invention containing a water sprayer used to wet and cool the limestone.

In another embodiment, a more simplified version is used. This simplified version is especially useful when retrofitting the LEC system onto an existing coal-fired furnace. The basic unit module of such a system is illustrated in FIG. 4. This apparatus is identical to the apparatus in FIG. 1 with the exception that the FIG. 4 apparatus uses a water spray to cool the limestone and does not contain means for preheating the combustion air. Thus, in this embodiment, the limestone is cooled by a water spray and the necessary film of water on the limestone particles is provided by the added water.

The apparatus of FIG. 4 has housing 24, limestone gravel bed 25, distributor plate 26, vibrator 27, water sprayer 28, means for adding limestone 29, and valves 30, 31, 32 and 33, which correspond to valves 4, 5, 7 and 8, respectively, of FIG. 1. The operation of the apparatus of FIG. 4 is identical to that of FIG. 1, except there is no preheating stage. Instead, the water sprayer cools the hot limestone after the cleaning stage and provides the necessary film of water for the subsequent filtering and scrubbing stage. Such a simple arrangement allows the system to be easily retrofitted onto existing equipment. The operation of this embodiment is summarized in Table 1.

TABLE 1

LEC Operation Schematic

| STAGE | OPERATION | VALVE POSITION 30 | 31 | 32 | 33 |
|---|---|---|---|---|---|
| Wetting | Water Spray | C | C | C | O |
| Filtering and Scrubbing | Stone Dries, Top to Bottom | O | O | C | C |
| Cleaning and Regeneration | Vibrator On | C | C | O | O |

Note: C = Closed; O = Open

Figure 5:
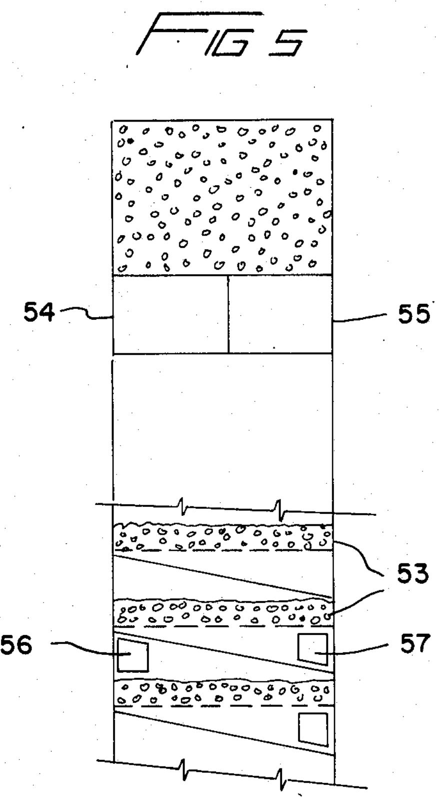
FIG. 5 illustrates one embodiment of the limestone emission control device having a stack of modules or beds.

Preferably, the overall LEC will consist of many of these beds such that one bed at a time may be taken off-line, cleaned and rewetted. FIG. 5 illustrates an embodiment of the invention having a plurality of modules which are arranged in the formation of a stack. The embodiment of FIG. 5 contains a plurality of modules, one of which is represented by numeral 53, an outlet duct 54, an inlet duct 55, a bed outlet 56, and a bed inlet 57.

In all the embodiments of this invention having a plurality of beds or modules, the sequencing of all three stages of operation are controlled by means of poppet valves. These valves are similar in design to those currently used for reverse air cleaned baghouses.

Figure 6:
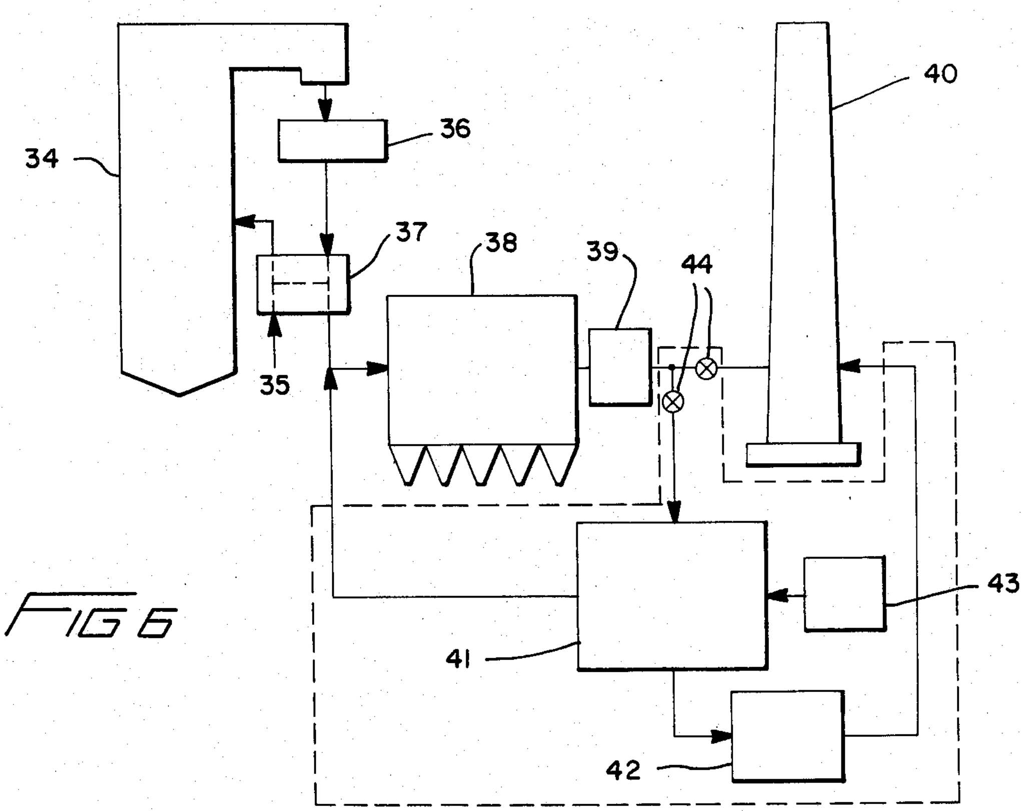
FIG. 6 is a schematic diagram for retrofitting a limestone emission control device on an existing coal fired furnace system.

A schematic illustration of retrofitting the embodiment which uses a wetting mode onto existing coal-fired furnaces is illustrated in FIG. 6.

In the embodiment of FIG. 6, the existing furnace contains a boiler 34, air supply 35, economizer 36, air heater 376, electrostatic precipitator 38, induced draft fan 39, and stack 40. The retrofitted portion is enclosed by the broken line of FIG. 6. The retrofitted portion includes the LEC 41 which would take the flue gases from the existing induced draft fan 39 and return them back to stack 40 by mens of new duct work. New induced draft fan 42 is included to provide the additional ΔP of the LEC equipment such that the present boiler pressure balance is undisturbed. A new reverse air fan 43 is provided to remove the reaction product crust and any fly ash from the LEC. This reverse air stream (5–10% of the total air stream) with its dust can be directed into the inlet of the existing electrostatic precipitator, thus adding this additional dust load to the existing collection and disposal equipment. Valves 44 control the two streams connecting the electrostatic precipitator to the stack and LEC. The retrofitted LEC provides improved particulate control for two reasons. First, the existing electrostatic precipitator now operates on flue gases and particulates from relatively high sulfur coal, thus avoiding the performance degradation associated with low sulfur coal and its resultant high resistivity ash. Second, the LEC serves as a secondary particle collection device.

The removal of sulfur oxides may also be enhanced by adding to the scrubbing material any of the various additives described in U.S. Pat. No. 4,115,518, the specification of which is incorporated herein by reference. These additives include alkali metal halides, alkaline earth metal halides, ammonium halides and hydrogen halides.

The following Examples are provided to describe the present invention in greater detail; however, they should not be construed to be limitations thereof.

EXAMPLE 1

Unconditioned 700° F. flue gas is passed through the apparatus illustrated by FIG. 1 by opening valves 4 and 5. During this filtering and scrubbing stage valves 6, 7, 8 and 9 are closed, and the vibrator is off. Next, valves 4 and 5 are closed, and valves 6 and 9 are opened to let in hot air at 500° F. During this time, the vibrator is turned on. This results in a separation of the crust from the limestone particles and this crust along with the accumulated fly ash is passed out of the system through valve 9. In the final stage, valves 6 and 9 are closed and valves 7 and 8 are opened to allow air at 60° F. to pass through the system. This air exits the system through valve 8 at 500° F. The vibrator is off during this final stage. This Example is summarized below in Table 2.

TABLE 2

| | STAGE | | |
|---|---|---|---|
| Valve | Filtering & Scrubbing | Cleaning | Pre-Heat |
| 4 | 700° flue gas in | X | X |
| 5 | 100° flue gas to ID fan | X | X |
| 6 | X | 500° hot air | X |
| 7 | X | X | 60° F. air in |
| 8 | X | X | 500° combustion air |
| 9 | X | Dirty gas out | X |
| Vibration | Off | On | Off |
| Time | $\frac{100\,(M-1)}{2}$ % | $\frac{100}{M}$ % | $\frac{100\,(M-1)}{2}$ % |
| Features | (1) Stone heats from top to bottom (2) $SO_2$ reaction in condensation zone (3) Cycle ends as bottom gets hot | Vibration (or stirring) frees fly ash on surface sulfates | Stone cools from bottom to top |

Note: M = total number of modules or beds

EXAMPLE 2

A simplified version which uses a preliminary wetting stage is carried out in the apparatus illustrated by FIG. 4. The wetting stage is conducted by spraying water on the bed of limestone particles. Next, unconditioned flue gas at 300° F. is introduced from above the bed and flowed down through the bed at a superficial velocity of about 100 ft. per minute. The flue gas is cooled to near (but above) the adiabatic saturation point. The gas exits the apparatus at about 180° F. $SO_2$ and fly ash particulates are removed from the flue gas stream by the wet limestone. At the end of this stage, the limestone granules are dry and coated with crust of friable calcium sulfate/sulfite. A considerable amount of fly ash is also contained within the bed of limestone at this point. In the final stage of operation, the downward flow of flue gas is stopped and a reverse upward flow of clean air is started. The upward flow (superficial velocity of 1–2 ft. per second) may be less than that required for fluidization and, if so, mechanical vibration of the porous support plate, along with the upward flow, will induce fluidization. The collected fly ash and friable sulfate/sulfite coating is mechanically abraded from the limestone granules by the fluidization and subsequently elutriated from the bed by the upward air flow. The reverse air and vibration is then stopped and the bed is then ready for rewetting and placing back on line. At appropriate intervals, a measured amount of limestone is fed into the bed to replace that which is removed by the process. The vibration during cleaning levels the added stones such that the bed height is made uniform.

EXAMPLE 3

Unconditioned flue gas at 350° F. is passed through a bed of limestone having a volume of 1 cubic foot. The gas contains an initial concentration of 2000 ppm $SO_2$ (1 gr/ft$^3$) and is passed through the limestone at about 100 ft./minute. The gas has a residence time within the limestone of about 0.6 seconds/ft. of thickness. The limestone is initially wet with about 10 lb. of water. After a period of forty minutes, the limestone becomes dry such that further operation would require cooling of the limestone by either preheating the combustion air or by water wetting the limestone. After the forty minute period, 0.54 lb. of ash is collected and 0.77 lb. of calcium sulfate crust material is collected. The gas exiting the system is 100° F. and contains approximately 200 ppm $SO_2$ (0.05 gr/ft.$^3$).

While the present invention has been described in terms of certain preferred embodiments, one skilled in the art will readily appreciate that various modifications, changes, omissions and substitutions may be made without departing from the spirit thereof. It is intended, therefore, that the present invention be limited soley by the scope of the following claims.

I claim:

1. A process for removing acid gas from flue gas comprising:

(a) pssing unconditioned flue gas containing acid gas through a bed of particulate scrubbing material whereby a thin film of water condensation forms on the scrubbing material and the acid gas forms a crust of solid reaction product on the scrubbing particles and the particles are heated;

(b) discontinuing the flow of gas after condensation ceases and the existing condensate evaporates;

(c) removing the crust from the particles by means of agitation;

(d) passing a stream of gas free of acid gas through the bed whereby the crust material is entrained in the gas and removed from the bed in the gas stream;

(e) coolinig the bed by passing an effective amount of precombustion air through the particles whereby the temperature of the particles is returned to below the dew point of the flue gas and the precombustion air is heated and a condensate of liquid water is formed on the previously heated particles when they are contacted with unconditioned flue gas;

wherein said acid gas is selected from the group consisting of sulfur oxides, nitrogen oxides and hydrogen halides and said scrubbing material is selected from the group consisting of calcium carbonate, magnesium carbonate, sodium carbonate, limestone, dolomite, nahcolite, trona, and mixtures containing two or more of these ingredients.

2. The process of claim 1 wherein the particulate scrubbing material contains calcium carbonate.

3. The process of claim 2 wherein the acid gas is an oxide of sulfur.

4. The process of claim 1 wherein the particulate scrubbing material is a mixture of limestone and a sodium compound selected from the group consisting of a carbonate of sodium, nahcolite and trona.

5. The process of claim 1 wherein the particulate scrubbing material contains an additive selected from the group consisting of alkali metal halides, alkaline earth metal halides, and ammonium halides.

6. A process for removing acid gas from flue gas comprising:

(a) passing unconditioned flue gas containing acid gas through a bed of particulate scrubbing material whereby a thin film of water condensation forms on the scrubbing material and the acid gas forms a crust of solid reaction product on the scrubbing particles;

(b) discontinuing the flow of flue gas after condensation ceases and the existing condensation evaporates;

(c) removing the crust from the particles by means of agitation;

(d) passing a stream of gas free of acid through the bed whereby the separated crust material is entrained in the gas and removed from the bed;

(e) cooling the bed to below the dew point of the flue gas by spraying water onto the particulate scrubbing material;

wherein said acid gas is selected from the group consisting of sulfur oxides, nitrogen oxides and hydrogen halides and said scrubbing material is selected from the group consisting of calcium carbonate, magnesium carbonate, sodium carbonate, limestone, dolomite, nahcolite, trona, and mixtures containing two or more of these ingredients.

7. The process of claim 6 wherein the particulate scrubbing material is selected from the group consisting of calcium carbonate, magnesium carbonate, sodium carbonate, limestone, dolomite, nahcolite, trona and mixtures having two or more of these ingredients.

8. The process of claim 7 wherein the particulate scrubbing material contains calcium carbonate.

9. The process of claim 8, wherein the acid gas is an oxide of sulfur.

10. The process of claim 7 wherein the particulate scrubbing material is a mixture of limestone and a sodium compound selected from the group consisting of carbonate of sodium, nahcolite and trona.

11. The process of claim 6 wherein the particulate scrubbing material contains an additive selected from the group consisting of alkali metal halides, alkaline earth metal halides and ammonium halides.

* * * * *